United States Patent [19]

Johansson

[11] 4,290,723

[45] Sep. 22, 1981

[54] TIMBER PACKAGE ARRANGER

[75] Inventor: Jan Johansson, Byske, Sweden

[73] Assignee: Renholmens Mekaniska Verkstad AB, Byske, Sweden

[21] Appl. No.: 45,568

[22] Filed: Jun. 4, 1979

Related U.S. Application Data

[63] Continuation of Ser. No. 802,345, Jun. 1, 1977, abandoned.

[51] Int. Cl.³ .............................................. B65G 57/10
[52] U.S. Cl. ..................................... 414/83; 198/462; 271/189; 271/218; 414/50; 414/52
[58] Field of Search ................... 414/749, 750, 82, 83, 414/84, 50, 52; 271/189, 191, 180, 181, 218; 198/459, 460, 461, 462

[56] References Cited

U.S. PATENT DOCUMENTS

| | | | |
|---|---|---|---|
| 2,686,603 | 8/1954 | Lawson | 414/60 |
| 2,996,040 | 8/1961 | Bofinger | 198/462 X |
| 3,298,683 | 1/1967 | Stroud | 271/189 |
| 3,565,241 | 2/1971 | Race et al. | 198/462 X |
| 3,593,860 | 7/1971 | Brenner | 414/84 X |
| 3,606,310 | 9/1971 | Larson | 414/84 X |

Primary Examiner—Frank E. Werner
Attorney, Agent, or Firm—Townsend and Townsend

[57] ABSTRACT

Apparatus is disclosed for assembling timber output at the delivery end of a feed conveyor in packages of layers. The feed conveyor delivers timber pieces in equally spaced relationship. A transfer device is provided in direct connection to the delivery end of the feed conveyor and includes at least two carrier planes movable individually and after one another in a cyclic path. One carrier plane is always in a phase of its cyclic movement so as to constitute a continuation of the feed conveyor for receiving timber pieces delivered from the conveyor to form a layer. Each carrier plane during said phase of its cyclic movement moves ahead in agreement with the feed conveyor a distance equal to the width of the timber piece during the time the feed conveyor moves a distance substantially equal to the width of the timber piece and the spacing between them until a layer is completed.

5 Claims, 3 Drawing Figures

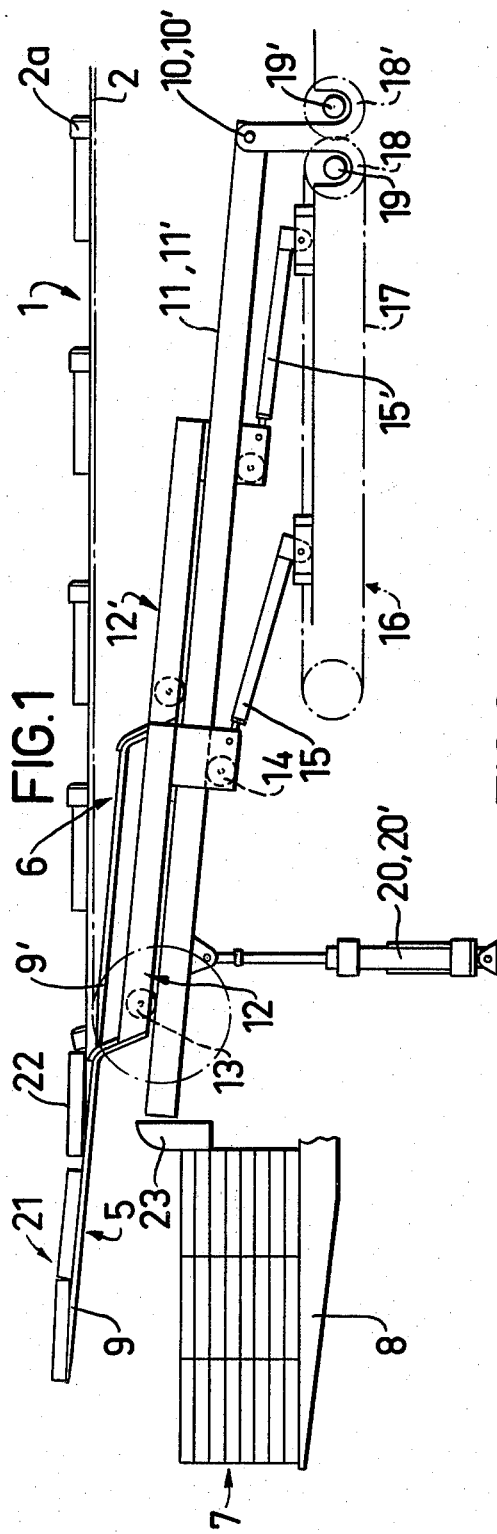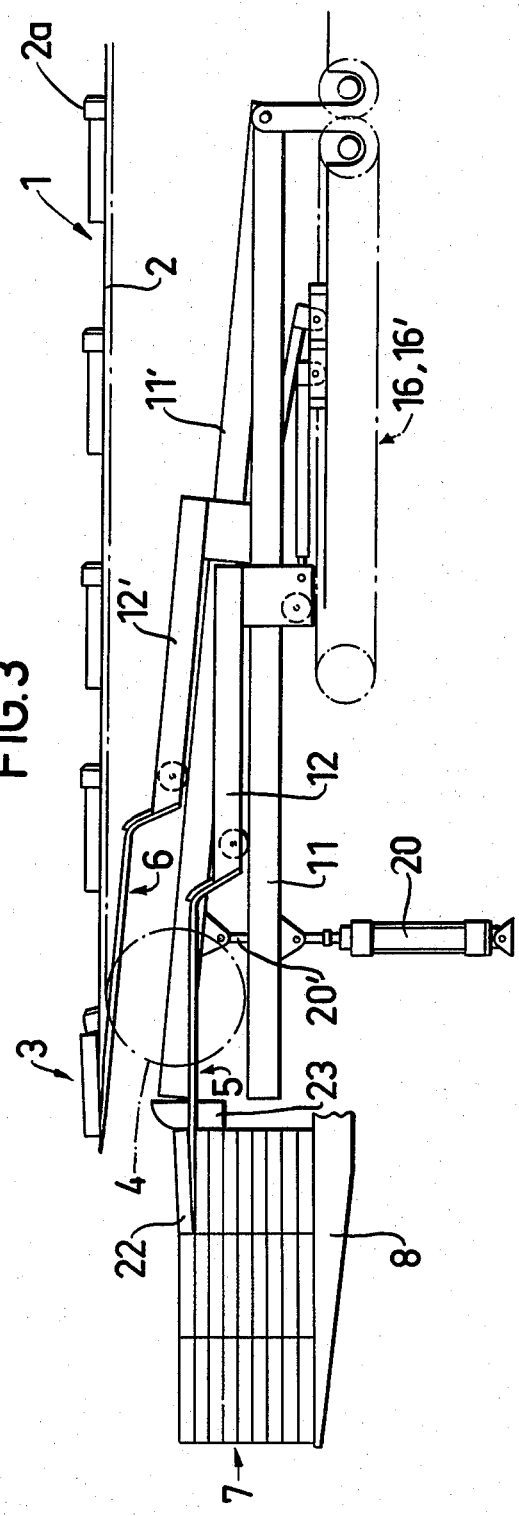

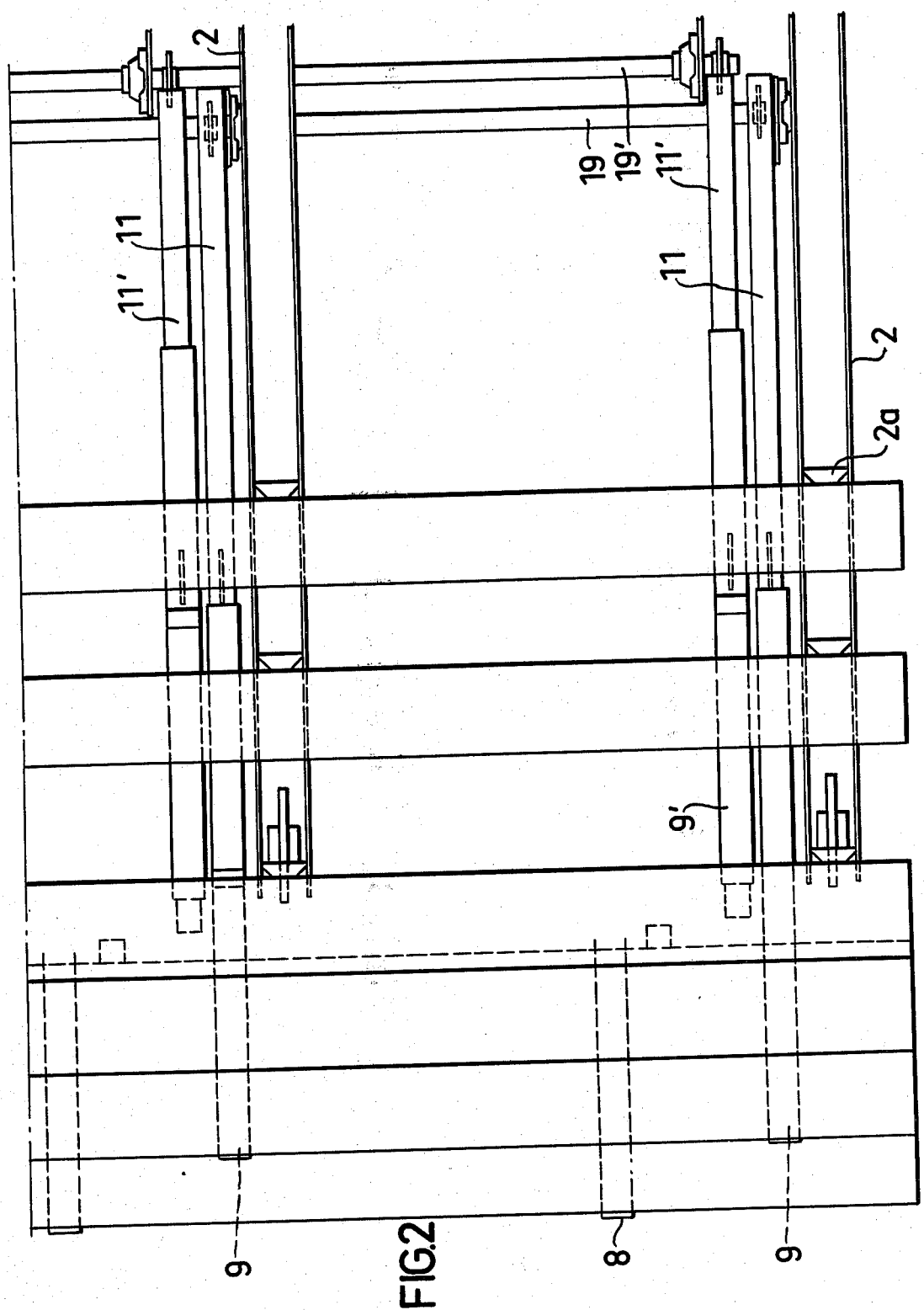

TIMBER PACKAGE ARRANGER

This is a continuation of application Ser. No. 802,345, filed June 1, 1977, now abandoned.

BACKGROUND OF THE INVENTION

This invention relates to an apparatus for arranging timber packages, more precisely to an apparatus for assembling layers of timber pieces to a package with or without sticks between the layers, comprising a device for transferring a layer of a predetermined number of timber pieces advanced one at a time by a feed conveyor to a liftable and lowerable stacking table disposed in the feed direction of said conveyor after the conveyor, on which table the layers are positioned by the transfer device and stacked one above the other to form a timber package, and which with the growth of the timber package correspondingly moves in steps until the package is completed.

Package arranger of the aforesaid kind are previously known and comprise, in addition to a transfer device, a special layer assembler conveyor in direct connection to the delivery end of the feed conveyor, from which layer assembler conveyor the transfer conveyor fetches a completed layer and transfers the same to the liftable and lowerable stacking table at the same time as the next layer to be transferred is assembled on the layer assembler conveyor. At these known package arrangers both a layer assembler conveyor and a transfer device are required for being able to transfer a layer and at the same time to assemble the next layer. The present invention, therefore, has the object of rendering a special layer assembler conveyor unnecessary and to produce a package arranger, the transfer device of which serves also as a layer assembler and renders it possible to assemble a layer while a layer already assembled is being transferred to the stacking table, and where the distance for transferring assembled layers to the stacking table is relatively short.

This object is achieved in that the apparatus according to the present invention has been given the characterizing features defined in the claims.

BRIEF DESCRIPTION OF THE DRAWINGS

The invention is described in greater detail in the following, with reference to the accompanying drawings, in which FIG. 1 is a schematic lateral view of the apparatus according to the invention in a phase of the stacking cycle of the apparatus, FIG. 2 is a horizontal view of a portion of the apparatus shown in FIG. 1, and FIG. 3 is a lateral view of the apparatus in a different phase of the stacking cycle.

DESCRIPTION OF THE PREFERRED EMBODIMENT

In the drawings, 1 generally designates a feed conveyor, which comprises a plurality of chains 2 arranged to the side of each other and having pushers 2a. The speed of this conveyor, measured in the number of pushers per minute, is adjustable as desired, for example by means of a variator (not shown), which can be coupled to the drive shaft (not shown) for the chains 2 of the feed conveyor which at the delivery end 3 of said conveyor turn over sprockets 4. The speed of the feed conveyor is recorded, for example, by a pulse emitter provided on said drive shaft and is reported to a programmed control unit (not shown) for the package arranger according to the invention.

According to the present invention, at least two individually movable carrier planes 5 and 6 are provided in direct connection to the delivery end 3 of the feed conveyor. They act consecutively after one another each both as layer assembler and transfer device and are caused to move cyclically by control of said control unit in the manner as described in the following. In FIG. 1 the carrier plane 5 is shown as a continuation of the feed conveyor 1 and acts in this position as a layer assembler, while the other carrier plane 6 in FIG. 1 is shown prepared to take over the layer assemblying function from the carrier plane 5 when this latter carrier plane after been provided with a layer transfers the same to a timber package being assembled, which generally is designated by 7 and supported on a liftable and lowerable stacking table 8 in a hoisting device provided after the delivery end of the feed conveyor.

The carrier plane 5 comprises a plurality of fingers 9, which are located to the side of each other and movable each along a guide 11 pivotal about a point 10 and are supported on the respective guides 11 each by a carriage 12 having at least two runners 13 on the upper surface of the associated guide and at least one holder-on runner 14 on the lower surface of the same guide. In order to cause the carriages and thereby the fingers 9 of the carrier plane to move along the guides 11, the carriages are connected by a link 15 each with a drive mechanism 16, comprising an endless chain 17 or the like provided about sprockets 18, one of which is stationary on a drive shaft 19. Said drive shaft, thus, is common to all drive mechanism 16 for the carrier plane 5, and hereby, thus, the fingers 9 of this carrier plane are moved synchronously. For lifting and lowering the carrier plane 5, the guides 11 are pivotal about their common support point 10 by piston-cylinder means 20, one for each guide 11 at the embodiment shown. At other embodiments, however, the guides can be interconnected by a transverse beam (not shown), whereby the number of piston-cylinder means can be reduced substantially. When, as in the present case, one piston-cylinder means 20 is provided for each guide 11, all piston-cylinder means 20 are driven synchronously so that the fingers 9 of the carrier plane 5 are maintained on the same level. The carrier plane 6 is of a similar design as the carrier plane 5 and is also driven in the same manner and, therefore, it is not described in greater detail. For an easier understanding, however, the reference numerals referring to the different elements of this carrier plane are given a '-sign. 9', thus, designates the fingers of the carrier plane 6 and, for example, 20' designates the piston-cylinder means for lifting and lowering the carrier plane 6.

In FIG. 1 the carrier plane 5 is shown in a phase of its cyclic movement or stacking cycle, during which a layer 21 is being assembled on the plane directly from the feed conveyor 1, and more precisely in a position, in which the carrier plane 5 after preceding positioning of timber piece thereon has been advanced or is being advanced one step corresponding to at least the width of the next timber piece to be advanced by the feed conveyor 1, in order to be able to receive in the example the last timber piece 22 of the layer 21. As soon as this timber piece 22 has been transferred onto the fingers 9 of the carrier plane, which transfer takes place by means of the pushers 2a of the feed conveyor, the carrier plane 5 is moved ahead along its guides 11, and also the other carrier plane 6 in position of preparedness is moved along its guides 11', which in this position assume the same position of inclination as the guides 11 of the carrier plane 5. The carrier plane 6 is moved only through such a distance as with its point to lie at a distance from the delivery end 3 of the feed conveyor which corresponds at least to the width of a timber piece (FIG. 3). The carrier plane 5 in its turn, however, is moved to a position above the stacking table 8, so that the timber piece last positioned thereon is located with its outer edge slightly to the side of a stop member 23 at the hoisting device. From this position the carrier plane 5 with its layer then is lowered by the piston-cylinder means 20 to position the layer on the table and on the uppermost timber layer thereon and then is returned, thereby pulling off the layer against the stop members 23 (see FIG. 3) to a rear end position on the guides 11. These guides then are pivoted upward by the piston-cylinder means 20, so that they have the same inclination as the guides 11' for the carrier plane 6, whereafter the carrier plane 5 is moved to a position of preparedness behind the carrier plane 6 in order rapidly to be moved into the position of the carrier plane 6 when this plane is transferring its layer to the stacking table 8.

The advancing movement of the carrier planes 5 and 6 during the assembly of a layer directly from the feed conveyor 1 can take place continuously or in steps. This feed movement is controlled by said control unit in agreement with the speed of the feed conveyor. The movement of the carrier planes along the respective guides 11 and 11' to the position above the stacking table, the return movement of the carrier planes and their movement to the position of preparedness behind the carrier plane being in layer assembling position and, thus, being a continuation of the feed conveyor, must take place relatively rapidly, in any case the return movement of the carrier planes to the position of preparedness, so that a carrier plane safely can return to its position of preparedness before a layer has been assembled on the carrier plane being in the layer assemblying position. These movements as well as the lifting and lowering of the carrier planes by the piston-cylinder means 20 and 21', respectively, are also controlled by said programmed control unit.

By using at least two carrier planes it is possible according to the invention to position the stacking table 8 very close to the delivery end 3 of the feed conveyor. Thereby the layer assembly can take place over the stacking table, which involves the advantage of a very short transport distance for transferring an assembled layer to the stacking table.

The invention is not restricted to the embodiment described above and shown in the drawings, but can be altered and modified in many different ways within the scope of the invention idea as it is defined in the claims. It is possible, for example, to provide more than two carrier planes, and the fingers in each carrier plane can be driven by a common drive mechanism instead of one mechanism for each finger as shown in the drawings.

What I claim is:

1. An apparatus for assembling timber output at the delivery end of a feed conveyor in packages of layers with or without sticks between the layers, comprising a device for transferring a layer of a predetermined number of timber pieces advanced one at a time to a liftable and lowerable stacking table provided after the conveyor in its feed direction, on which table the layers are positioned by the transfer device and stacked one above the other to form a timber package, and which is adapted with the growth of the timber package to correspondingly move in steps until the package is completed, characterized in that the feed conveyor delivers timber pieces in equally spaced relationship, the transfer device is provided in direct connection to the delivery end of the feed conveyor and comprises at least two carrier planes movable individually and after one another in a cyclic path, of which carrier planes always one in a phase of its cyclic movement constitutes a continuation of the feed conveyor for receiving timber pieces delivered from said conveyor to form a layer, which then is transferred by the same, and that each carrier plane during said phase of its cyclic movement moves ahead in agreement with the feed conveyor a distance equal to the width of the timber piece during the time the feed conveyor moves a distance substantially equal to the width of the timber piece and the spacing between them until a layer is completed.

2. An apparatus according to claim 1 characterized in that means are provided in order after the transfer of a layer to the stacking table rapidly to return the carrier plane to a position of preparedness directly after the other carrier plane.

3. An apparatus according to claim 1, characterized in that each carrier plane during said phase is substantially over the stacking table.

4. An apparatus according to claim 1, characterized in that the movement of the carrier planes in agreement with the feed conveyor takes place in steps.

5. An apparatus according to claim 1, characterized in that the movement of the carrier planes in agreement with the feed conveyor takes place continuously.

* * * * *